United States Patent [19]

Bristot

[11] Patent Number: 5,405,298
[45] Date of Patent: Apr. 11, 1995

[54] BELT TENSIONER, AND A TRANSMISSION SYSTEM INCLUDING SUCH A TENSIONER

[75] Inventor: Pierre Bristot, Ballan, France

[73] Assignee: Hutchinson, Paris, France

[21] Appl. No.: 146,011

[22] PCT Filed: Mar. 11, 1993

[86] PCT No.: PCT/FR93/00245
§ 371 Date: Nov. 12, 1993
§ 102(e) Date: Nov. 12, 1993

[87] PCT Pub. No.: WO93/18317
PCT Pub. Date: Sep. 16, 1993

[30] Foreign Application Priority Data

Mar. 12, 1992 [FR] France ............... 92 02943

[51] Int. Cl.$^6$ ............................................. F16H 7/08
[52] U.S. Cl. .................................................. 474/136
[58] Field of Search ............... 474/101, 109–117, 474/133–138

[56] References Cited

U.S. PATENT DOCUMENTS 4,790,801 12/1988 Schmidt .
4,952,198 8/1990 Cartaud et al. ............. 474/110 X
4,976,660 12/1990 Breindl ......................... 474/110 X
5,026,330 6/1991 Zermati et al. .................. 474/138

FOREIGN PATENT DOCUMENTS 512036 6/1952 Belgium .
0289814 11/1988 European Pat. Off. .
0407261 1/1991 European Pat. Off. .
2635569 2/1990 France .
2644541 9/1990 France .
2645931 10/1990 France .

Primary Examiner—Michael Powell Buiz
Attorney, Agent, or Firm—Oblon, Spivak, McClelland, Maier & Neustadt

[57] ABSTRACT

The invention relates mainly to a tensioner for a transmission belt, in particular a power transmission belt, e.g. a V-belt or a ribbed belt, and also for a toothed belt used for timing purposes in the automobile industry. The invention also relates to a transmission system including such a tensioner. According to the invention, a tensioner for a belt comprising two fixing members, in particular eye links mechanically interconnected by a spring, and two chambers containing fluid and hydraulically interconnected via a connection including a passage of calibrated section that determines a degree of damping provided by the fluid flowing from one chamber into the other under drive from pumping member whenever there is a variation in the distance between the two fixing members, wherein the two chambers are substantially coaxial.

18 Claims, 6 Drawing Sheets

BELT TENSIONER, AND A TRANSMISSION SYSTEM INCLUDING SUCH A TENSIONER

The invention relates mainly to a tensioner for a transmission belt, in particular for a power transmission belt, e.g. a V-belt or a ribbed belt, and for a toothed belt as used for timing purposes in the automobile industry. The invention also relates to a transmission system including such a tensioner.

BACKGROUND OF THE INVENTION

It is known that a system for transmitting power from one shaft to another by means of a belt requires the presence of a belt tensioner in order to obtain satisfactory operation, and consequently, proposals have already been made for numerous tensioner devices that include both a metal spring and means for damping the vibrations generated in the belt by cyclic irregularities in the running of an engine.

Although such known devices give satisfaction, they are generally complex in structure and thus bulky and expensive.

A simplified and more compact device is described in French patent application No. 89 03512 published under the number FR 2 644 541. That device includes a tensioning wheel that co-operates with the belt, a return spring, a damping device that includes a first variable volume chamber situated inside the return spring covered in a rubber sheath, and a second variable volume chamber situated in line with the spring, the two chambers communicating with each other via a check-valve to obtain damping. The space occupied by the second chamber is not negligible, and in addition the spring relaxes when belt tension diminishes, thereby further increasing the space occupied by that device.

In addition, modern engines are putting constraints of ever increasing severity on belts such that the damping obtained using the device described in the above-mentioned patent application is insufficient since the pressure acceptable in the first chamber is limited by the strength of the rubber sheath covering the spring.

U.S. Pat. No. 4,790,801 describes a hydraulic belt tensioner comprising a cylinder and a piston forming an internal chamber of variable volume and an external chamber coaxial with the inner chamber. The inner chamber and the outer chamber are interconnected by a large non-return ball valve. When the piston rises in the cylinder, thereby increasing the volume of the inner chamber, oil is sucked from the outer chamber, through the valve and into the cylinder. The large dimensions of the valve give rise to little damping. When the piston moves down inside the cylinder, it causes the valve to close, and a large amount of damping is obtained by a throttled flow of oil between the piston and the cylinder.

Unfortunately, it is extremely difficult to calibrate such a flow which, in addition, varies both with operating temperature and with the amount of wear that the device has suffered.

OBJECTS AND SUMMARY OF THE INVENTION

Consequently, an object of the present invention is to provide a belt tensioner, in particular for a power transmission belt, that enables high levels of damping to be obtained, particularly when belt tension is increased.

It is also an object of the present invention to provide a belt tensioner, in particular for a power transmission belt, that enables extremely rapid return to be obtained, in particular when the belt relaxes.

Another object of the present invention is to provide a belt tensioner, in particular for a power transmission belt, that is simple in structure and thus low in manufacturing cost.

It is also an object of the invention to provide such a tensioner that is more compact, and in particular shorter than known devices, and that thus has the advantage of requiring less space in use, thereby making it suitable for applications where available volume is limited, e.g. in certain systems associated with automobile engines.

Another object of the present invention is to provide a tensioner whose dynamic behavior varies little with temperature.

It is also an object of the present invention to provide a tensioner suitable for being adapted to desired damping levels, particular as a function of the engine to which it is to be fitted.

These objects are achieved by a tensioner including two chambers filled with a fluid, in particular with oil, and a small diameter calibrated passage enabling the fluid to flow between the two chambers while providing considerable damping. By using a calibrated passage it is possible to obtain a flow (in particular a turbulent flow) that is substantially independent of external conditions, and in particular temperature. Advantageously, the tensioner of the present invention includes a second fluid passage of much greater flow section between the two chambers, the second passage advantageously being accessible to the fluid only for a flow that is caused by a decrease in belt tension.

The invention mainly provides a tensioner for a belt, the tensioner comprising two fixing means, in particular eye links mechanically interconnected by a spring, and two chambers containing fluid and hydraulically interconnected via a connection including a calibrated flow section that determines a degree of damping provided by the fluid flowing from one chamber into the other under drive from pumping means whenever there is a variation in the distance between the two fixing means, wherein the two chambers are substantially coaxial.

The invention also provides a tensioner, wherein the spring is a coil spring, and wherein an internal chamber is radially defined by a rigid cylinder whereas an outer chamber is radially defined firstly by the outer wall of the cylinder and secondly by a sheath of elastomer material, in particular rubber, covering the coil spring.

The invention also provides a tensioner, wherein its connection between the two chambers includes a valve member having passages suitable for being at least partially masked during the flow of fluid from the inner chamber towards the outer chamber, and suitable for being uncovered during the flow of fluid from the outer chamber towards the inner chamber.

The invention also provides a tensioner, wherein the valve member is constituted by a star-shaped moving plate, with the maskable passages being disposed at its periphery.

The invention also provides a tensioner, wherein the valve member comprises a star-shaped plane portion secured to a cup-shaped portion, in particular a cup having a flat bottom and a cylindrical wall interconnected by a wall that is circular in cross-section.

The invention also provides a tensioner, wherein the pumping means include a piston separating the two chambers and of a diameter that is slightly less than the bore diameter of the cylinder so as to allow fluid to flow in between the piston and the cylinder.

The invention also provides a tensioner, wherein the ends of the coil spring are fixed to the fixing means of the tensioner, and sealing is provided between the ends of the sheath and the fixing means of the tensioner by collars crimped onto said fixing means.

The invention also provides a tensioner, wherein cohesion thereof is provided by the cylinder and by the pumping means, in particular by a rod of the piston.

The invention also provides a tensioner, wherein the valve member is provided with a return spring urging it towards a rest position in which the maskable passages are masked.

The invention also provides a tensioner, including means for applying prestress to the spring, in particular a stop ring on the piston.

The invention also provides a tensioner, including a duct allowing fluid to flow between the two chambers and provided in the piston.

The invention also provides a tensioner, wherein the duct includes a radial channel opening out in the vicinity of the top end of the piston and connected via an axial channel to a calibrated passage disposed at the base of the piston.

The invention also provides an engine transmission system including a belt and at least two pulleys, and a tensioner of the invention, fixed at a first end to the engine block and connected at its opposite end to a lever mounted to pivot about an axis and carrying a wheel at its other end which bears against the belt, the wheel and the fixing point between the tensioner and the engine block both lying on the same side of the belt.

BRIEF DESCRIPTION OF THE DRAWINGS

The invention will be better understood from the following description and the accompanying figures given by way of non-limiting examples, and in which.

MORE DETAILED DESCRIPTION

In FIGS. 1 to 8, the same references are used to designate the same elements.

Figure 1:
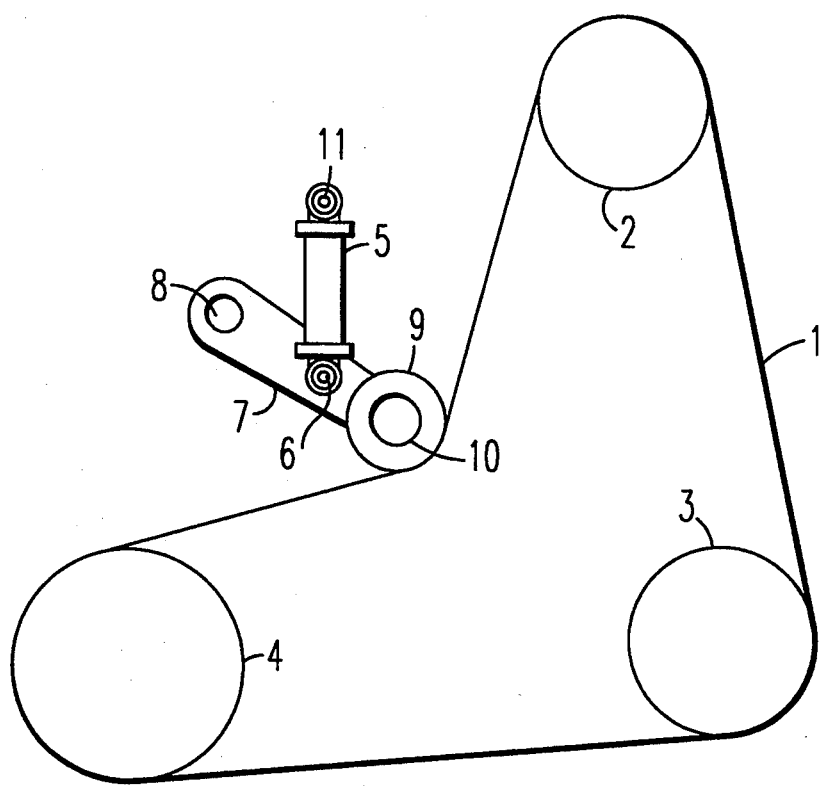
FIG. 1 is a diagrammatic view of a system of the invention for transmitting power by belt.

Reference is made initially to FIG. 1 which is a highly diagrammatic representation of a power transmission system in which a belt 1 co-operates with the cheeks of pulleys 2 and 3 constrained to rotate with driven shafts, and with the cheeks of a pulley 4 constrained to rotate with a driving shaft, e.g. the crank shaft of an engine in an automobile, a truck, an agricultural machine, or the like. To keep the belt 1 under tension, a tensioner 5 is associated with the system, the tensioner having an eye 6 connected to a lever 7 that is pivotally mounted at one of its end about an axis 8 and that has a wheel 9 at its other end which is free to rotate about an axis 10 and which bears against the belt 1. The eye 11 of the tensioner 5 opposite to its eye 6 is fixed to the engine block (not shown) and the tensioner is designed to take up any lengthening of the belt 1 so as to avoid any slipping between the belt and the cheeks of the pulleys, and also so as to damp the vibrations generated in the belt 1 by cyclic irregularities in engine running conditions, in particular when idling, and also during the jolts that occur whenever loads driven by the shafts secured to the pulleys 2 and 3 are switched on and/or off.

Advantageously, the point where the tensioner 5 is fixed to the engine block and the wheel 9 both lie on the same side of the belt so that any reduction in belt tension increases the distance between the eyes 6 and 11.

The tensioner 5 shown in FIG. 2 comprises a bottom eye link 12 including the eye 6 and a top eye link 13 including the eye 11, a coil spring 14 extending between the eye links, the spring being coated with a sheath of elastomer material 15, e.g. a nitrile rubber, forming the side wall of a fluid-filled outer chamber 16, which fluid may be a mineral oil that provides good lubrication, a silicone oil whose viscosity varies little with temperature, or a liquid and gas. Inside the chamber 16, there is a cylinder 17 whose walls define an inner chamber 18 in which there slides a piston 19 serving to pump the fluid between the two chambers and vertically separating the chambers 16 and 18.

Figure 2C:
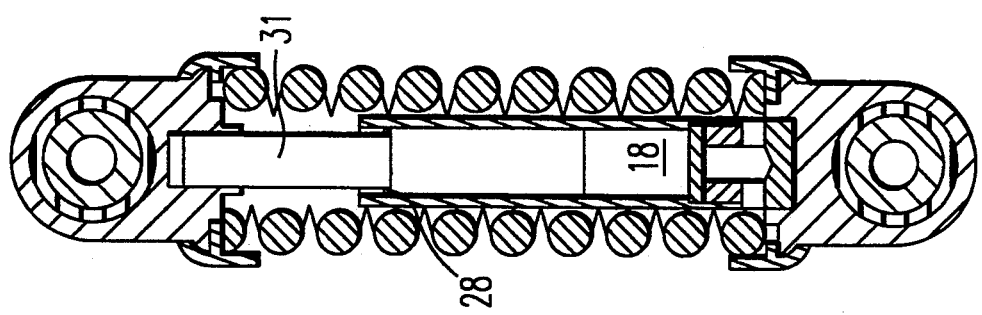
FIG. 2 comprises three longitudinal sections through a first embodiment of a tensioner of the present invention.
Figure 2B:
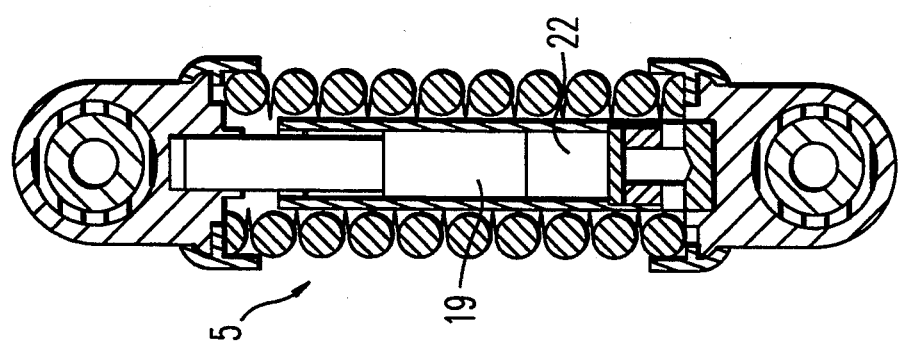

As a result, the outer chamber 16 which is substantially coaxial around the inner chamber 18 is delimited radially inwardly by the outer wall of the cylinder 17 and radially outwardly by the sheath 15 covering the spring 14. In the embodiment shown, the outer chamber 16 extends over the full (variable) height of the tensioner 5 between the two eye links 12 and 13, whereas the height of the inner chamber 18 is less than the height of the tensioner 5 in its normal working position as shown in FIG. 2b. The volume of the inner chamber 18 decreases due to the piston 19 moving downwards when the two eye links 12 and 13 move towards each other.

Advantageously, sealing between the sheath 15 and the eye links 12 and 13 is provided by collars 20 and 21 crimped onto semi-toroidal sealing rings formed on the outside face of the sheath 15.

The bottom portion of the inner chamber 18 communicates with the outer chamber 16 via a valve member 22, an axial duct 23, and radial passages 24 formed through a seat 25 for the valve member 22, and which can be seen more clearly in FIG. 3.

Figure 4:
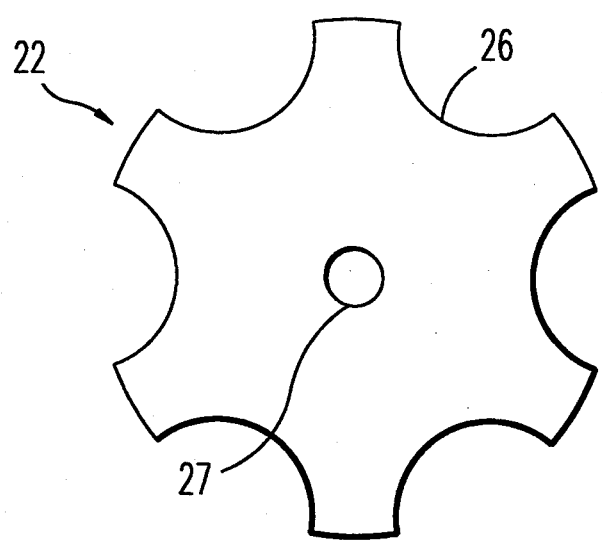
FIG. 4 is a plan view of a first embodiment of a valve member suitable for use in the tensioner of the present invention.

As can be seen in FIG. 4, the valve member 22 includes maskable passages 26 and, advantageously, at least one non-maskable calibrated passage 27. In the variant embodiment of the tensioner of the present invention shown in FIG. 8, the non-maskable calibrated passage 27 is disposed at the inlet to a duct connecting the inner chamber 18 to the outer chamber 16 and formed in the piston 19. In the example shown in FIG. 8, the valve member 22 is a plane plate in the form of a star provided with a central calibrated hole 27. In FIG.

Figure 7A:
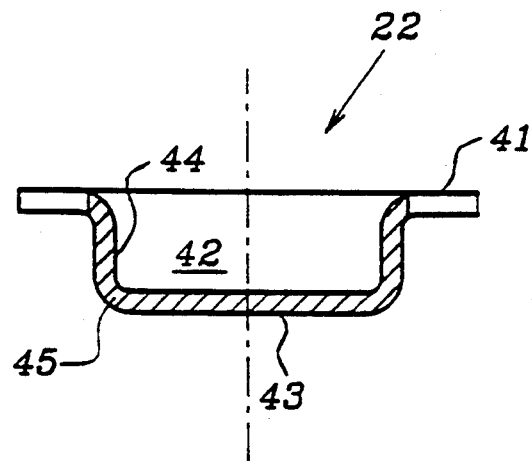
FIG. 7 comprises views of a second embodiment of a valve member suitable for use in the tensioner of the present invention.
Figure 7B:
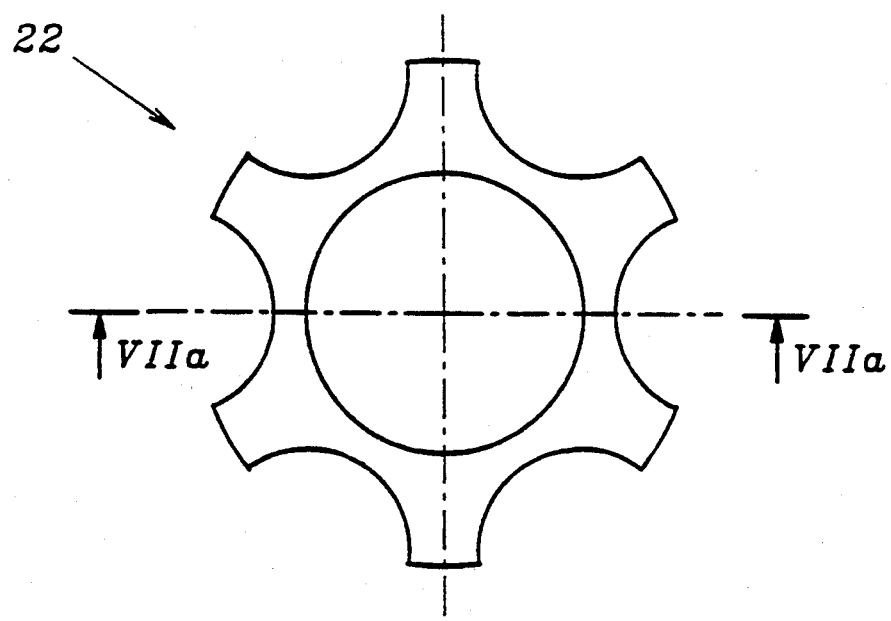

7, there can be seen an advantageous variant embodiment of the valve member in accordance with the present invention that comprises a plane top portion in the form of a star connected to a cup-shaped portion 42 including a flat bottom 43 extending orthogonally to a cylindrical wall 44. In section, the transition 45 between the wall 44 and the wall 43 follows a circular arc. The valve member of FIG. 7 is suitable for co-operating with a conical seat. Under such circumstances, when the valve member is lifted only a little, large flow sections are released enabling the oil to rise more freely, thereby enabling the belt to be tensioned more quickly.

Figure 2A:
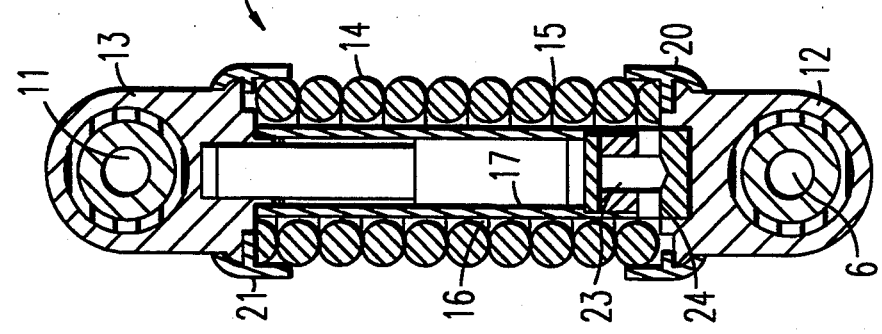

Advantageously, the spring 14 is prestressed in compression. For example, the upper portion of the cylinder 17 is provided with a stop ring 28 limiting the upward stroke of the piston 19, as shown in FIG. 2c. In the normal working position, tension in the belt 1 as transmitted via the wheel 9 and the lever arm 7 compresses the spring 14 and ensures that the piston 19 moves downwards as illustrated in FIG. 2b. FIG. 2a shows the position of maximum compression, with the bottom face of the piston 19 being in the immediate vicinity of the valve member 22.

Figure 3A:
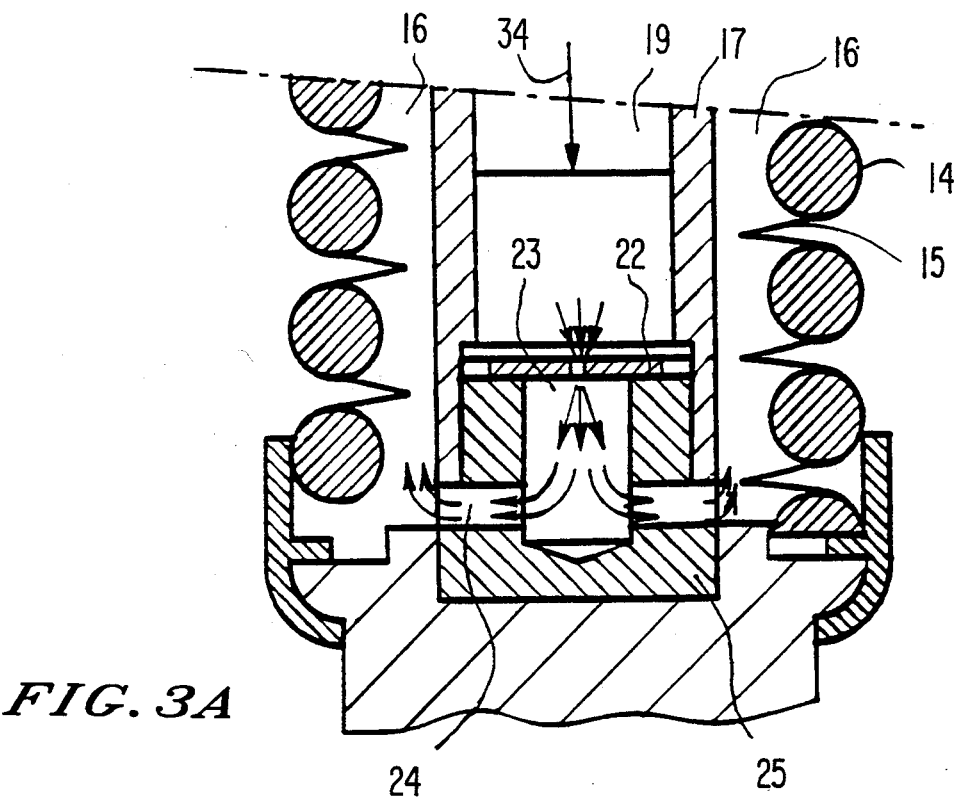
FIG. 3 comprises two section views showing a detail of the tensioner of the present invention.
Figure 3B:
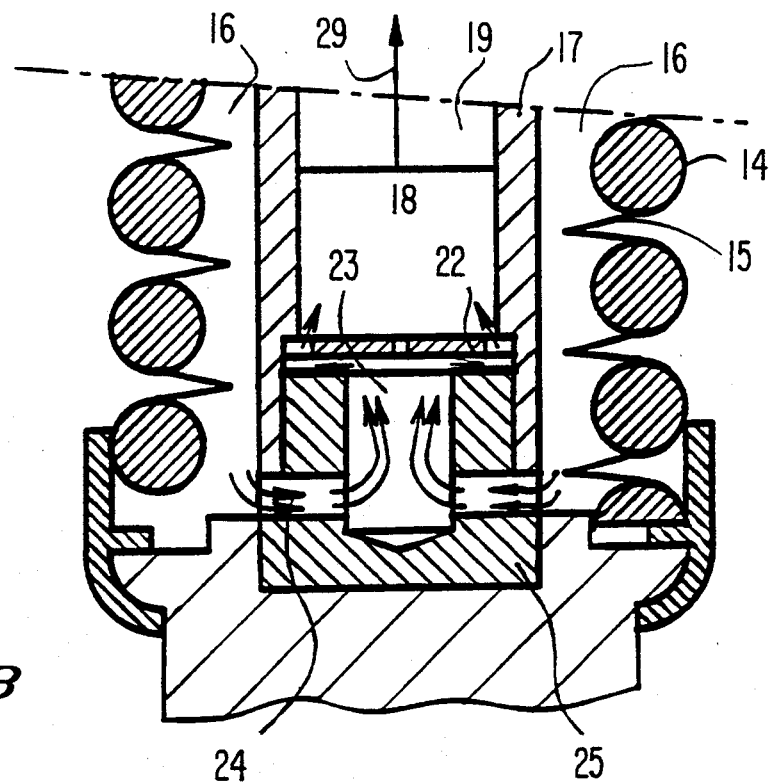

Advantageously, when tension in the belt 1 increases, and consequently the eyes 6 and 11 move towards each other, damping is very considerable, whereas when tension in the belt 1 decreases with the eyes 6 and 11 moving away from each other, damping is low or negligible, thereby enabling belt tension to be taken up as quickly as possible. This type of operation is shown more particularly in FIG. 3. Advantageously the valve member 22 has vertical clearance. While the spring is being compressed as symbolized by arrow 34 in FIG. 3a, the valve member 22 is pressed against its seat 25, thereby masking the maskable passages 26 around its periphery and leaving open one or more calibrated passages 27. The flow of fluid through the calibrated passage(s) 27 represented by arrows in FIG. 3a provides the desired damping. The fluid flows from the inner chamber 18 into the outer chamber 16.

In a variant embodiment, damping is caused by fluid flowing in between the cylinder 17 and the piston 19 via calibrated clearance.

Similarly, it is possible to provide calibrated clearance in between the cylinder 17 and the piston 19 simultaneously with a non-maskable calibrated passage 27. The flow in between the cylinder 17 and the piston 19, together with the flow through the passage 27 must give rise to the desired amount of damping. The flow of oil in between the cylinder 17 and the piston 19 ensures lubrication of the inside walls of the cylinder 17 and of the outside walls of the piston in a manner that is particularly effective when mineral oil is used as the fluid, thereby improving guidance and reducing wear.

It should be observed that only the inner chamber 18 having a rigid cylinder 17 (e.g. a steel) is subjected to the high pressure that is required for obtaining a large amount of damping. The pressure in the chamber 16 is lower, and in all events low enough to be withstood by the sheath 15.

During a reduction in belt tension, the piston 19 moves up as shown by arrow 29 (see FIG. 3b) and it entrains the valve member 22, thereby uncovering its maskable passages 26 thus offering a flow cross-section that is large enough to enable the fluid to flow quickly with little or no damping, thus enabling tension in the belt 1 to be taken up again quickly.

Naturally, partially maskable openings make it possible to vary the amount of damping between increased pressure (FIG. 3a) and decreased pressure (FIG. 3b) without going beyond the scope of the invention.

Figure 5:
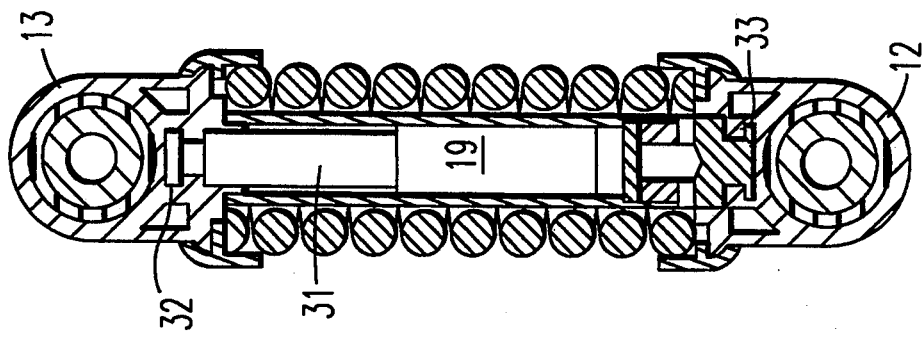
FIG. 5 is a longitudinal section view through a second embodiment of the tensioner of the present invention.

Similarly, in a variant embodiment shown in FIG. 5, a spring 30 presses the valve member 22 against the seat 25, thereby masking the maskable passages 26. When the piston 19 rises, it entrains the valve member 22 upwards in the figure, thereby enabling pressure equilibrium to be reestablished quickly between the outer chamber 16 and the inner chamber 18.

The spring 30 makes it possible to reduce the time required for closing the maskable passages 26, since the rest position of the valve member is against its seat 25 or, in any event, closer to said seat.

Figure 6:
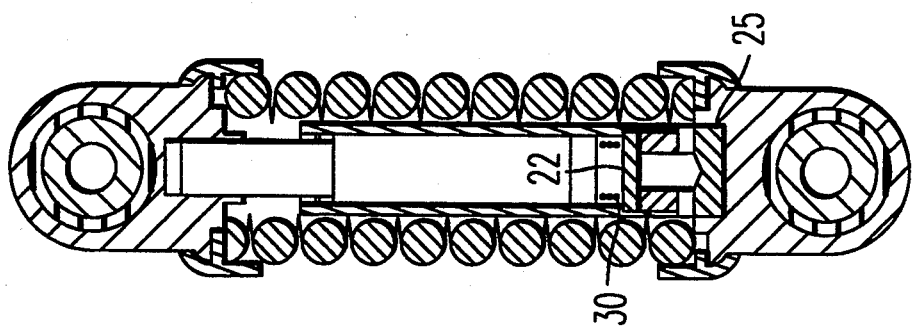
FIG. 6 is a longitudinal section through a third embodiment of the tensioner of the present invention.

Advantageously, the cohesion of the tensioner 5 of the present invention is provided by its hydraulic components. For example, a rod 31 of the piston 19 may be secured to eye link 13 while the seat 25 of the valve member 22 secured to the cylinder 17 is anchored in eye link 12. An advantageous example of such fixing is shown in FIG. 6 where the top end of the rod 31 of the piston 19 is provided with a shoulder 32 while the bottom portion of the seat 25 is provided with a shoulder 33.

In order to ensure that the embodiment of the tensioner of the present invention as shown in FIG. 2 operates properly, it may be advantageous to leave air in the outer chamber 16 and to take precautions to avoid the air penetrating into the inner chamber 18 during assembly.

Similarly, it is possible to fill the outer chamber 16 with a gas at a pressure that can be withstood by the sheath 15. It is also possible to fill the outer chamber 16 with any compressible fluid that is compatible with the oil filling the inner chamber 18.

Figure 8A:
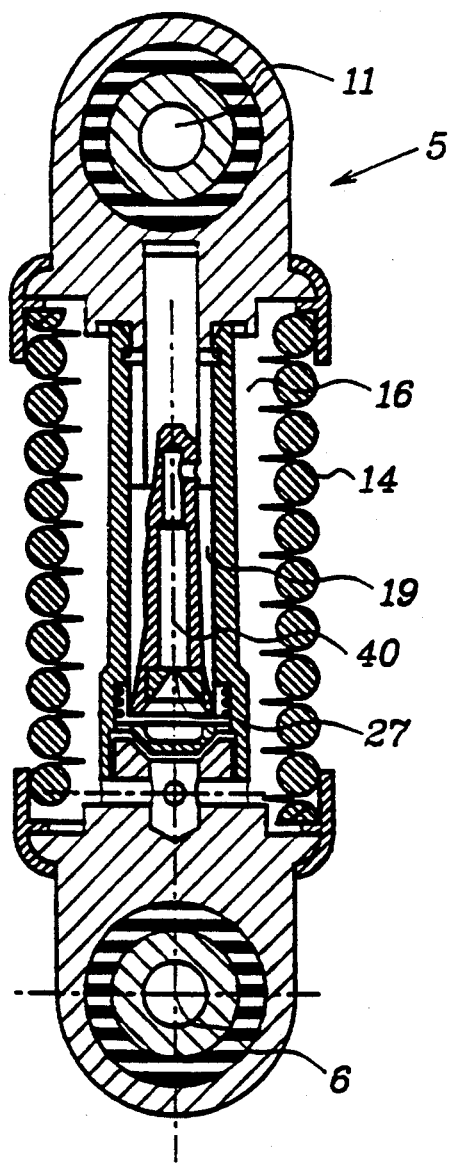
FIG. 8 comprises two longitudinal sections through a third embodiment of a tensioner of the present invention.
Figure 8B:
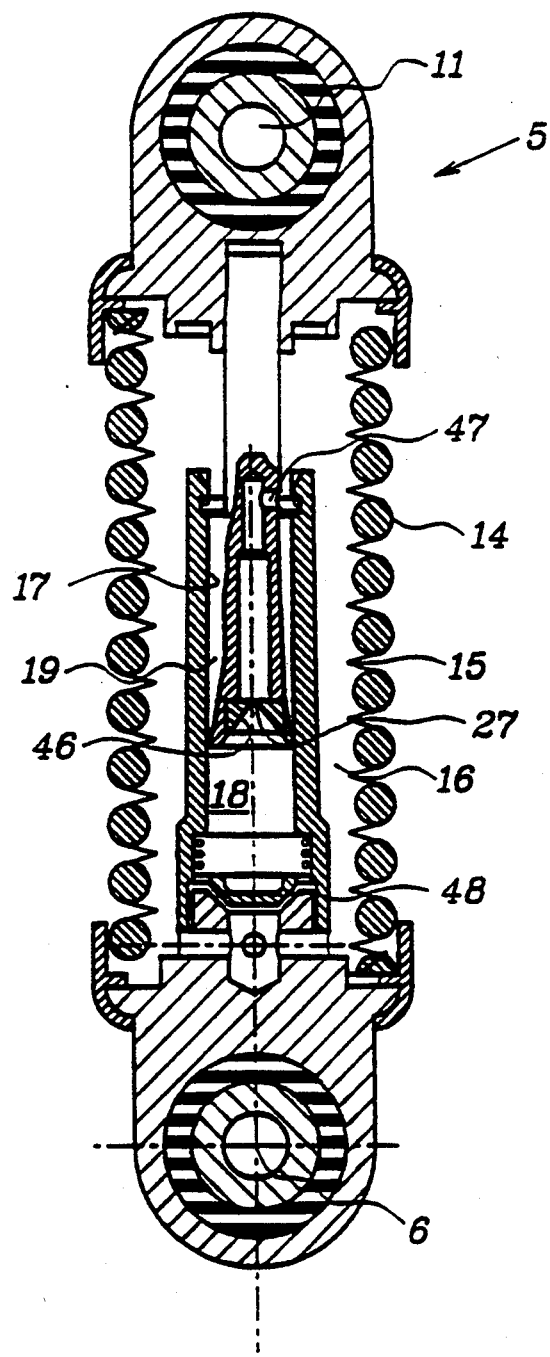

FIG. 8 shows the preferred embodiment of the tensioner of the present invention. The tensioner advantageously includes the valve member 22 of FIG. 7 together with a piston 19 that includes a duct 40 enabling oil to flow from the inner chamber 18 to the outer chamber 16. In the preferred embodiment, the duct includes a calibrated passage 27 situated at the apex of a conical element 46 disposed in the bottom portion of the piston 19. The duct 40 mainly comprises a channel situated along the axis of the piston 19 and connected by means of a transverse channel 47 to the outer chamber 16. The duct 40 enables fluid to flow from the chamber 18 towards the chamber 16 on the tensioner passing from the relaxed configuration of FIG. 8b to the compressed condition shown in FIG. 8a.

The embodiment shown in FIG. 8 presents numerous advantages. Using the valve member 22 of FIG. 7 in association with a conical seat 48 makes it possible to obtain extremely fast flow of fluid from the outer chamber into the inner chamber whenever the belt 1 relaxes. There is no danger that refilling of the inner chamber 18 might be disturbed by oil cavitation phenomena at the outlet from the calibrated orifice 27. This prevents the inner chamber 18 becoming filled with a gas that would interfere with damping. The oil sucked in is clean since it is remote from the zone that might be disturbed which zone is at the outlet from the channel 47. In addition, the tensioner of FIG. 8 is self-priming since any gas that happens to be present in the inner chamber 18 naturally escapes upwards through the duct 40. Thus, firstly there is less need to take precautions while installing the tensioner of FIG. 8 than there is with the tensioner of FIG.

2, and secondly should gas appear in the inner chamber 18 while the tensioner is in operation, that will not disturb operation thereof for long.

Thus, the tensioner of FIG. 8 is suitable for operating under conditions of greater stress with higher damping forces, greater displacement amplitude, and higher excitation frequencies. It applies less stress to the belt 1 and its lifetime is greater than that of the variant shown in FIG. 2.

The tensioner of the present invention may be adapted to the desired degree of damping by an appropriate selection of the flow section through the calibrated passage 27. A large section reduces the degree of damping whereas a small section leads to a high degree of damping.

Naturally, tensioners provided with calibrated passages 27 of large diameter and/or with large amounts of clearance between the cylinder 17 and the piston 19 and that therefore provide a small or even negligible amount of damping do not go beyond the ambit of the present invention.

It should be observed that the tensioner 5 must be installed a particular way up, the valve member 22 must be at its bottom end. Otherwise any air or gas under pressure will be sucked in initially when the valve member opens thus preventing proper filling of the inner chamber 18. Nevertheless, it will be understood that a tensioner that does not need to be installed a particular way up does not lie outside the ambit of the present invention.

I claim:

1. A tensioner for a belt, the tensioner comprising two fixing means, in particular eye links mechanically interconnected by a spring, and an internal and an outer substantially coaxial chambers containing fluid and hydraulically interconnected via a connection including a calibrated flow passage that determines a degree of damping provided by fluid flowing from the internal chamber to the outer chamber under drive from pumping means whenever there is a reduction in a distance between the two fixing means;
   wherein said calibrated flow passage includes at least one of: (1) an aperture extending through a valve member which hydraulically connects said internal and outer chambers with fluid flowing through said aperture when there is a reduction in the distance between the two fixing means; and (2) a passage disposed in a piston of said pumping means, with said piston at least partially disposed in said internal chamber such that fluid flows from said internal chamber through said passage of said piston and into said outer chamber when there is a reduction in the distance between the two fixing means.

2. A tensioner according to claim 1, wherein the pumping means include a piston separating the two chambers and of a diameter that is slightly less than the bore diameter of the cylinder so as to allow fluid to flow in between the piston and the cylinder.

3. A tensioner according to claim 1, wherein its connection between the two chambers includes a valve member having passages suitable for being at least partially masked during the flow of fluid from the inner chamber towards the outer chamber, and suitable for being uncovered during the flow of fluid from the outer chamber towards the inner chamber.

4. A tensioner according to claim 1, wherein cohesion thereof is provided by the cylinder and by the pumping means, in particular by a rod of the piston.

5. A tensioner according to claim 1, including means for applying prestress to the spring, in particular a stop ring on the piston.

6. The tensioner of claim 1, wherein said calibrated flow passage includes said aperture extending through said valve member, and wherein said aperture is open both during flow from said internal chamber to said outer chamber and during flow from said outer chamber to said inner chamber, and wherein said valve member further includes at least one maskable passage which is open during flow from said outer chamber to said inner chamber and closed during flow from said inner chamber to said outer chamber.

7. The tensioner of claim 1, wherein said calibrated flow passage includes said aperture extending through said valve member, and wherein said valve member is disposed at a bottom of said internal chamber.

8. The tensioner of claim 1, wherein said calibrated flow passage includes said passage disposed in said piston, and wherein said piston further includes a conical inlet at a lower end thereof, with said calibrated flow passage extending from an apex of said conical inlet.

9. A tensioner for a belt, the tensioner comprising two fixing means mechanically interconnected by a spring, and two substantially coaxial interconnected chambers containing a fluid, with said two chambers interconnected by a calibrated flow passage that determines a degree of damping provided by the fluid flowing from one chamber into the other under a drive from pumping means in response to a variation in a distance between the two fixing means;
   wherein a valve member is provided with a return spring urging the valve member towards a rest position, said valve member including a plurality of maskable passages, and wherein in said rest position the maskable passages are masked to prevent flow through the maskable passages.

10. A tensioner for a belt, the tensioner comprising two fixing means mechanically interconnected by a spring, and two substantially coaxial interconnected chambers containing a fluid, with said two chambers interconnected by a calibrated flow passage that determines a degree of damping provided by the fluid flowing from one chamber into the other under a drive from pumping means in response to a variation in a distance between the two fixing means;
   wherein the tensioner includes a valve member which comprises a star-shaped plane portion secured to a cup-shaped portion, with the cup-shaped portion having a flat bottom and a cylindrical wall that is circular in cross-section.

11. A tensioner for a belt, the tensioner comprising two fixing means mechanically interconnected by a spring, and two substantially coaxial interconnected chambers containing a fluid, with said two chambers interconnected by a calibrated flow passage that determines a degree of damping provided by the fluid flowing from one chamber into the other under a drive from pumping means in response to a variation in a distance between the two fixing means;
   wherein said calibrated flow passage includes a duct allowing fluid to flow between the two chambers and provided in a piston of said pumping means.

12. A tensioner according to claim 11, wherein the includes a radial channel opening out in the of the top end of the piston and connected via an axial channel to a calibrated passage disposed at the base of the piston.

13. A power transmission system comprising:
   a driving shaft;
   a first pulley constrained to rotate with said driving shaft;
   a second pulley;
   a driven shaft constrained to rotate with said second pulley;
   a belt passing over said first and second pulleys;
   a lever pivotably mounted at a first end about an axis and comprising a wheel free to rotate on the belt on a second end;
   a tensioner which bears said wheel against the belt comprising a first fixing means fixed to a stationary support, said first fixing means lying on a same side of the belt as said wheel, and a second fixing means, with said first and second fixing means being mechanically interconnected by a spring, and an internal and an outer substantially coaxial chambers containing fluid and hydraulically interconnected via a connection including a calibrated flow passage that determines a degree of damping provided by the fluid flowing from the internal chamber to the outer chamber under drive from pumping means whenever there is a reduction in the distance between the two fixing means;
   wherein said calibrated flow passage includes at least one of: (1) an aperture extending through a valve member which hydraulically connects said internal and outer chambers with fluid flowing through said aperture when there is a reduction in the distance between the two fixing means; and (2) a passage disposed in a piston of said pumping means, with said piston at least partially disposed in said internal chamber and wherein fluid flows from said internal chamber through said passage of said piston and into said outer chamber when there is a reduction in the distance between the two fixing means.

14. A tensioner for a belt, the tensioner comprising two fixing means mechanically interconnected by a spring, and substantially coaxial internal and outer interconnected chambers containing a fluid, with said internal and outer chambers interconnected by a calibrated flow passage that determines a degree of damping provided by the fluid flowing from one chamber into the other under a drive from pumping means in response to a variation in a distance between the two fixing means;
   wherein the spring is a coil spring, and wherein the internal chamber is radially defined by a rigid cylinder and the outer chamber is radially defined by an outer wall of the rigid cylinder and by a sheath of an elastomer material covering the coil spring, such that an inner surface of said sheath covering said spring forms a radially outer limit of said outer chamber and said outer wall of said rigid cylinder forms a radially inner limit of said outer chamber.

15. A tensioner according to claim 14, wherein the ends of the coil spring are fixed to the fixing means of the tensioner, and sealing is provided between the ends of the sheath and the fixing means of the tensioner by collars crimped onto said fixing means.

16. A tensioner for a belt, the tensioner comprising two fixing means mechanically interconnected by a spring, and substantially coaxial internal and outer interconnected chambers containing a fluid, with said internal and outer chambers interconnected by a calibrated flow passage that determines a degree of damping provided by the fluid flowing from one chamber into the other under a drive from pumping means in response to a variation in a distance between the two fixing means, the tensioner further including a valve member having maskable passages which are at least partially masked during flow of fluid from the internal chamber towards the outer chamber and which are uncovered during the flow of fluid from the outer chamber towards the inner chamber;
   wherein the valve member is constituted by a star-shaped moving plate, with the maskable passages being disposed at its periphery.

17. The tensioner of claim 16, wherein said calibrated flow passage includes an aperture extending through said star shaped moving plate.

18. The tensioner of claim 16, wherein said calibrated flow passage includes a passage disposed in a piston of said pumping means such that fluid flows through said passage disposed in said piston in response to a reduction in the distance between said two fixing means.

* * * * *